US012078250B2

(12) United States Patent
Svrcek et al.

(10) Patent No.: US 12,078,250 B2
(45) Date of Patent: *Sep. 3, 2024

(54) PISTON SEALING RING ASSEMBLIES

(71) Applicant: Mainspring Energy, Inc., Menlo Park, CA (US)

(72) Inventors: Matt Svrcek, Redwood City, CA (US); Jodie Prudhomme, San Francisco, CA (US)

(73) Assignee: Mainspring Energy, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/733,228

(22) Filed: Apr. 29, 2022

(65) Prior Publication Data

US 2022/0356948 A1 Nov. 10, 2022

Related U.S. Application Data

(63) Continuation of application No. 16/561,846, filed on Sep. 5, 2019, now Pat. No. 11,346,445, which is a
(Continued)

(51) Int. Cl.
*F16J 9/16* (2006.01)
*F16J 9/26* (2006.01)

(52) U.S. Cl.
CPC ... *F16J 9/16* (2013.01); *F16J 9/26* (2013.01)

(58) Field of Classification Search
CPC .................................... F16J 9/16; F16J 9/26
See application file for complete search history.

(56) References Cited

U.S. PATENT DOCUMENTS

| 4,781 A | 10/1846 | Richards |
|---|---|---|
| 1,251,630 A | 1/1918 | Brandum |

(Continued)

FOREIGN PATENT DOCUMENTS

| CH | 095881 A | 8/1922 |
|---|---|---|
| GB | 190429560 A | 3/1905 |

(Continued)

OTHER PUBLICATIONS

U.S. Appl. No. 16/100,092 (U.S. Pat. No. 10,436,322), filed Aug. 9, 2018, Matt Svrcek.
(Continued)

*Primary Examiner* — Eugene G Byrd
(74) *Attorney, Agent, or Firm* — HALEY GUILIANO LLP

(57) ABSTRACT

The present disclosure provides a sealing ring assembly having a first ring and a second ring, configured to seal a high-pressure region from a lower pressure region of a piston and cylinder device. Accordingly, the sealing ring assembly includes a high-pressure boundary and a low-pressure boundary. Each ring may be segmented, and the first and second rings interface along a surface. Along the surface at the interface, a groove open to the lower pressure region aids in pressure locking the sealing ring assembly. A pocket in the second ring allows for high pressure gas to aid in balancing radial forces on the sealing ring assembly. As the sealing ring wears, the first and second rings remain engaged with one another.

31 Claims, 9 Drawing Sheets

Related U.S. Application Data continuation of application No. 16/100,092, filed on Aug. 9, 2018, now Pat. No. 10,436,322.

(60) Provisional application No. 62/543,302, filed on Aug. 9, 2017.

(56) References Cited

U.S. PATENT DOCUMENTS

| | | | |
|---|---|---|---|
| 1,911,736 A | 5/1933 | Wilkening | |
| 1,970,892 A * | 8/1934 | Kirn | F16J 9/16 |
| | | | 277/467 |
| 2,055,153 A * | 9/1936 | Madsen | F16J 9/14 |
| | | | 277/486 |
| 3,186,723 A | 6/1965 | Wagner | |
| 3,305,241 A | 2/1967 | Hart | |
| 3,315,968 A | 4/1967 | Hanlon | |
| 3,462,159 A | 8/1969 | Baumann et al. | |
| 3,632,121 A * | 1/1972 | Wahlmark | F16J 9/28 |
| | | | 277/492 |
| 3,743,303 A | 7/1973 | Pope | |
| 4,089,534 A * | 5/1978 | Litherland | F16J 15/32 |
| | | | 277/572 |
| 4,185,842 A | 1/1980 | Magara | |
| 4,455,974 A | 6/1984 | Shapiro et al. | |
| 4,516,481 A | 5/1985 | Geffroy et al. | |
| 4,579,349 A | 4/1986 | Pipich et al. | |
| 4,582,328 A | 4/1986 | Howarth | |
| 4,741,543 A | 5/1988 | Geffroy et al. | |
| 5,403,019 A | 4/1995 | Marshall | |
| 5,921,553 A | 7/1999 | Klein | |
| 6,045,135 A | 4/2000 | Feistel | |
| 6,059,293 A | 5/2000 | Azibert et al. | |
| 6,068,263 A | 5/2000 | Azibert et al. | |
| 6,193,236 B1 | 2/2001 | Helpap | |
| 6,322,080 B1 | 11/2001 | Feistel | |
| 6,340,161 B1 | 1/2002 | Zitting et al. | |
| 6,428,014 B2 * | 8/2002 | Scarlett | F16J 9/16 |
| | | | 277/435 |
| 6,439,578 B1 | 8/2002 | Radcliffe | |
| 6,457,722 B1 | 10/2002 | Feistel | |
| 6,715,766 B2 | 4/2004 | Kirby et al. | |
| 7,634,963 B2 * | 12/2009 | Maier | F16J 9/28 |
| | | | 92/248 |
| 8,177,237 B2 | 5/2012 | Lindner-Silwester et al. | |
| 8,430,628 B2 | 4/2013 | Turnquist et al. | |
| 8,807,571 B2 | 8/2014 | Chalk et al. | |
| 9,133,933 B1 | 9/2015 | Feistel | |
| 9,388,902 B2 | 7/2016 | Sueyoshi et al. | |
| 9,856,821 B1 | 1/2018 | Svrcek | |
| 10,436,322 B2 | 10/2019 | Svrcek | |
| 10,443,727 B2 | 10/2019 | Svrcek | |
| 10,731,759 B2 * | 8/2020 | Svrcek | F16J 9/16 |
| 10,927,953 B2 * | 2/2021 | Svrcek | F16J 9/26 |
| 11,193,587 B2 * | 12/2021 | Feistel | F16J 15/24 |
| 11,193,588 B2 * | 12/2021 | Svrcek | F16J 9/28 |
| 11,326,694 B2 * | 5/2022 | Steffen | F04B 37/08 |
| 11,346,332 B2 * | 5/2022 | Kanei | F16J 9/16 |
| 11,629,782 B2 * | 4/2023 | Flade | F16J 9/20 |
| | | | 417/53 |
| 2003/0006562 A1 * | 1/2003 | Feistel | F16J 9/28 |
| | | | 277/434 |
| 2003/0127802 A1 | 7/2003 | Bennitt et al. | |
| 2005/0051970 A1 | 3/2005 | Edelmann | |
| 2007/0137957 A1 | 6/2007 | Carlstedt et al. | |
| 2008/0289491 A1 | 11/2008 | May et al. | |
| 2011/0049811 A1 | 3/2011 | Sueyoshi et al. | |
| 2013/0167798 A1 | 7/2013 | Lawler et al. | |
| 2014/0090554 A1 | 4/2014 | Chalk et al. | |
| 2014/0298984 A1 | 10/2014 | Hofbauer et al. | |
| 2019/0049006 A1 | 2/2019 | Prudhomme et al. | |
| 2019/0049007 A1 | 2/2019 | Prudhomme | |
| 2019/0049008 A1 | 2/2019 | Svrcek et al. | |
| 2019/0049009 A1 | 2/2019 | Svrcek | |
| 2019/0049013 A1 | 2/2019 | Svrcek | |
| 2019/0390770 A1 | 12/2019 | Svrcek | |
| 2020/0011417 A1 | 1/2020 | Svrcek | |
| 2023/0072947 A1 | 3/2023 | Svrcek et al. | |

FOREIGN PATENT DOCUMENTS

| | | |
|---|---|---|
| GB | 606824 A | 8/1948 |
| GB | 861876 A | 3/1961 |
| GB | 861877 | 3/1961 |
| JP | 54038430 A | 3/1979 |
| JP | 54-176057 U | 12/1979 |
| JP | 05-231459 A | 9/1993 |
| JP | 05-340474 A | 12/1993 |
| JP | 09-032922 A | 2/1997 |
| JP | 09-196182 A | 7/1997 |
| JP | 11-063225 A | 3/1999 |
| JP | 2012163118 A | 8/2012 |
| JP | 2015-169286 A | 9/2015 |
| WO | 95/14184 A1 | 5/1995 |

OTHER PUBLICATIONS

U.S. Appl. No. 16/561,846, filed Sep. 5, 2019, Matt Svrcek.
U.S. Appl. No. 16/100,131 (now U.S. Pat. No. 10,443,727), filed Aug. 9, 2018, Matt Svrcek.
U.S. Appl. No. 16/575,744, filed Sep. 19, 2019, Matt Svrcek.
U.S. Appl. No. 17/988,048, filed Nov. 16, 2022, Matt Svrcek.
EPO Office Action for Application No. 18760153.9 dated Nov. 30, 2020.
International Search Report and Written Opinion in Application No. PCT/US2018/046121, dated Nov. 6, 2018 (11 pages).

* cited by examiner

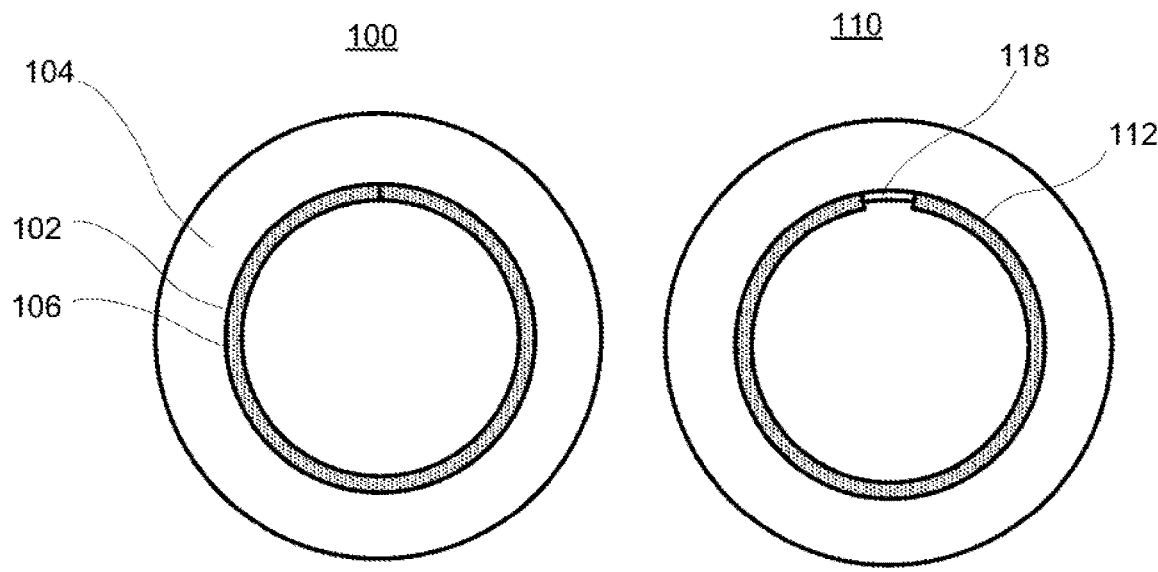
FIG. 1
(PRIOR ART)
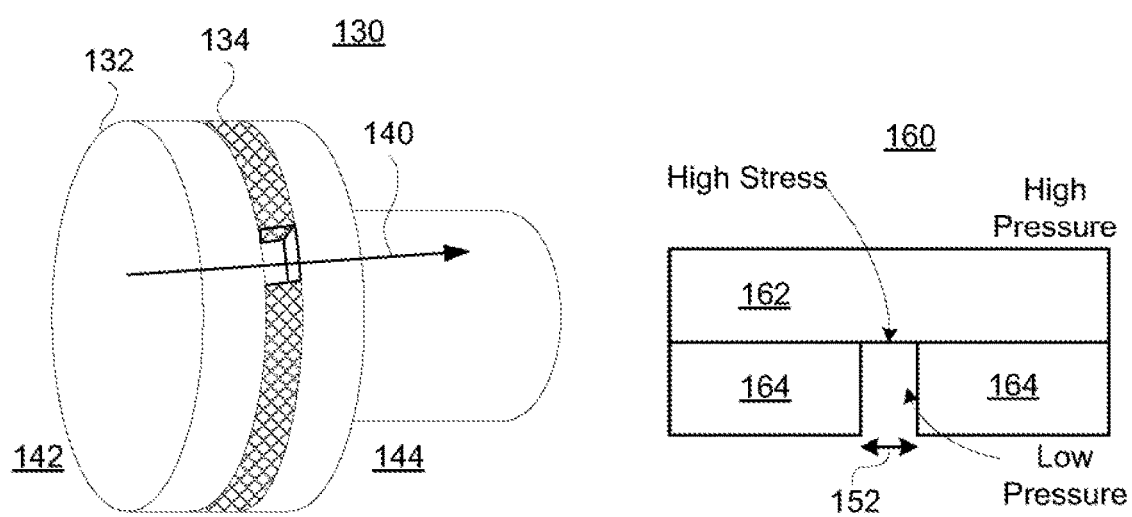
FIG. 2
(PRIOR ART)
FIG. 3
(PRIOR ART)

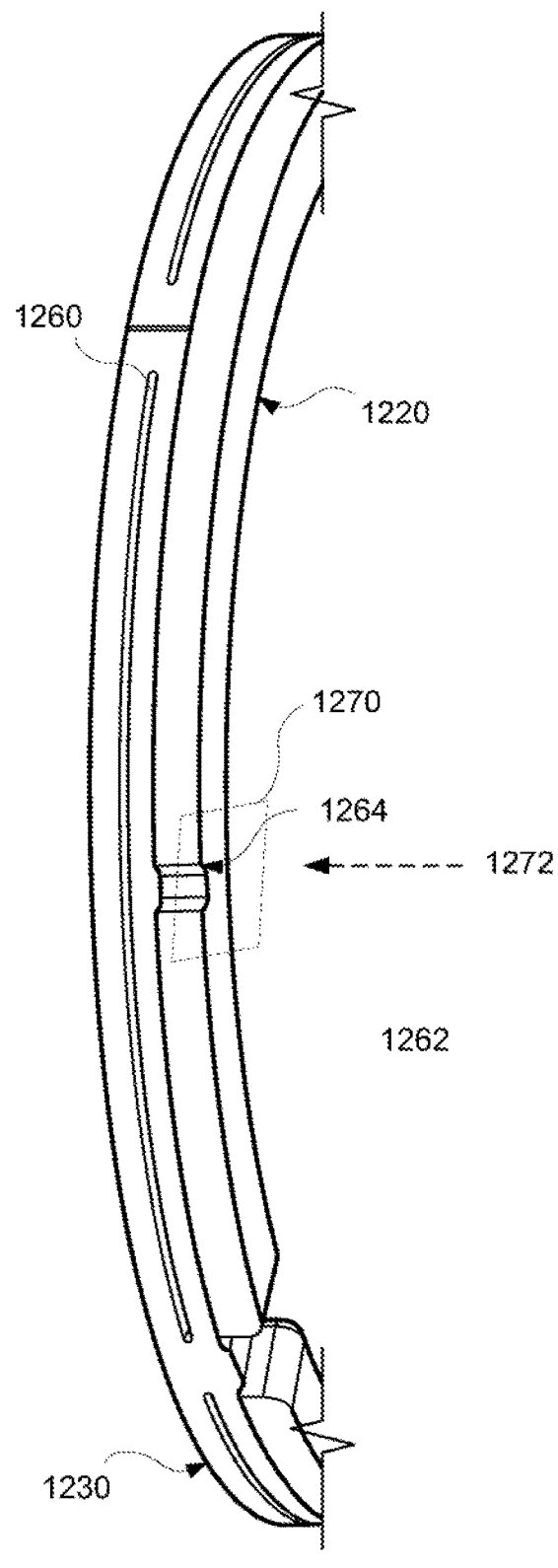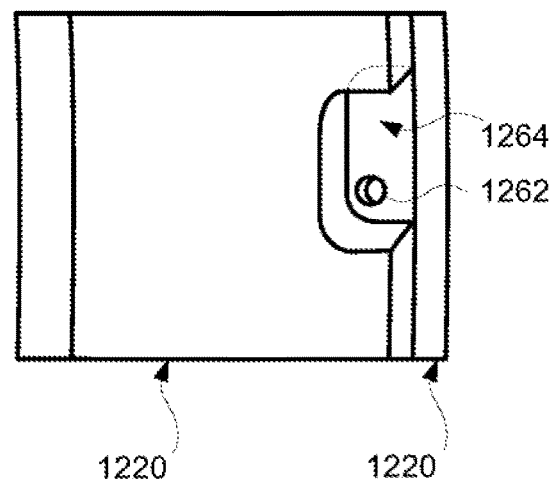
FIG. 12
FIG. 13

PISTON SEALING RING ASSEMBLIES

CROSS-REFERENCE TO RELATED APPLICATION

The present disclosure is directed towards sealing ring assemblies, and more particularly the present disclosure is directed towards twin sealing rings that include features to reduce wear, reduce fracture risk, and reduce uneven wear in the absence of lubricating oil. This application is a continuation of U.S. patent application Ser. No. 16/561,846, (now allowed), filed Sep. 5, 2019, which is a continuation of U.S. patent application Ser. No. 16/100,092 (now U.S. Pat. No. 10,436,322), filed Aug. 9, 2018, which claims the benefit of U.S. Provisional Patent Application No. 62/543,302 filed Aug. 9, 2017, the disclosures of which are hereby incorporated by reference herein in their entireties.

BACKGROUND

For economic reasons, it is desirable for a seal of a piston-cylinder assembly to function for as long as possible before needing replacement. For example, a typical target is hundreds or thousands of hours of operation. During these run hours the seal wears down radially, and gaps may form between portions of the seal. The total circumferential arc length of the resulting gap(s) opens by 2*pi*the radial wear of the seal. With a self-lubricating material in which the wear rate is relatively high, the gap opens by an amount that results in unacceptable leakage flow, thus limiting the effective operating life of the seal.

SUMMARY

In some embodiments, the present disclosure is directed to a sealing ring assembly including a first ring and a second ring. The first ring includes an extension extending axially rearwards, and the extension includes a radially outward surface. The second ring includes an inner radial surface configured to interface with the radially outward surface of the extension. The sealing ring assembly also includes a groove extending circumferentially along at least one of the radially outward surface of the extension and the inner radial surface of the second ring.

In some embodiments, the groove is configured to be open to a low-pressure boundary of the sealing ring assembly.

In some embodiments, the second ring includes a pocket that extends azimuthally in an outermost radial surface of the second ring. The pocket is configured to receive gas from a high-pressure boundary of the sealing ring assembly.

In some embodiments, the second ring includes an orifice that is configured to allow gas to flow from the high-pressure boundary to the pocket.

In some embodiments, the sealing ring assembly is configured to be arranged in a ring groove of a piston. The piston includes an anti-rotation relief and the sealing ring assembly comprises an anti-rotation tab that engages with the anti-rotation relief to prevent substantial azimuthal movement of the sealing ring assembly.

In some embodiments, the first ring includes an outermost radial surface and the radially outward surface of the extension is radially inward of the outermost radial surface.

In some embodiments, at least one of the first ring and the second ring includes a self-lubricating material. For example, in some embodiments, the first ring, the second ring, or both are made from graphite.

In some embodiments, the sealing ring assembly is configured for operation without liquid lubricant. For example, in some embodiments, the sealing ring assembly is configured for oil-less operation.

In some embodiments, the first ring includes at least two first ring segments. The at least two first ring segments are arranged such that respective ends of the at least two first ring segments form at least one interface between each other.

In some embodiments, the second ring includes at least two second ring segments. The at least two second ring segments are arranged such that respective ends of the at least two second ring segments form at least one interface between each other.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

FIG. 1 shows a cross-sectional end view of a portion of an illustrative piston and cylinder assembly;

FIG. 2 shows a perspective view of a portion of an illustrative piston assembly;

FIG. 3 shows a side view of a portion of an illustrative seal ring assembly;

FIG. 12 shows a perspective view of a portion of an illustrative sealing ring assembly including a feature for balancing radial forces, in accordance with some embodiments of the present disclosure;

FIG. 13 shows a perspective view of a portion of the illustrative sealing ring assembly of FIG. 10A, including a feature for balancing radial forces, in accordance with some embodiments of the present disclosure;

DETAILED DESCRIPTION

Figure 4:
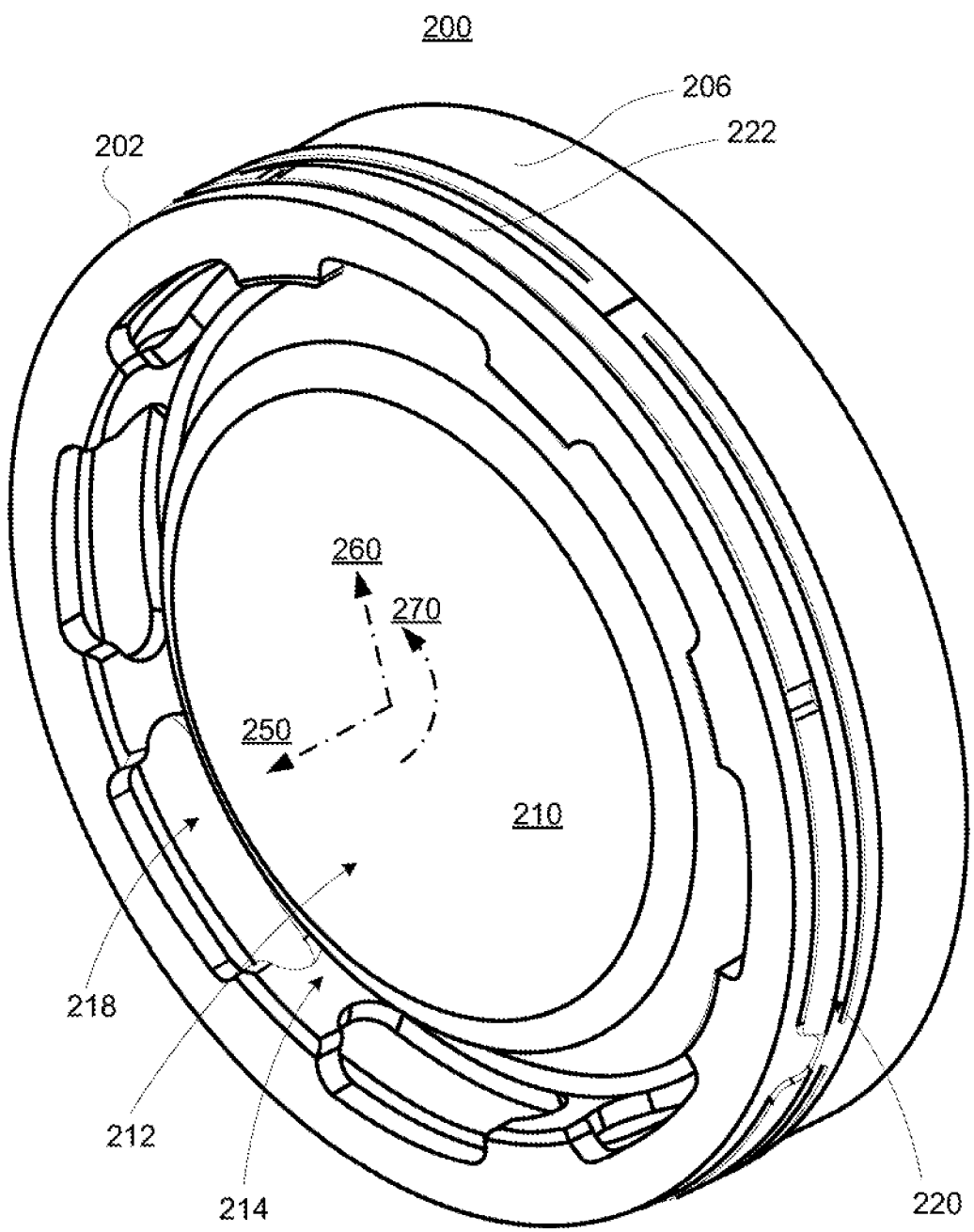
FIG. 4 shows a perspective view of a portion of an illustrative piston assembly, in accordance with some embodiments of the present disclosure.

The present disclosure is directed towards twin ring style seals having improvements over a basic twin ring geometry. These improvements are described in detail in the context of illustrative examples in the following description. Improvements include, at least, a reduction in wear rate for a given material and load, a reduction in the risk of a fracture from opening gaps in the rear ring, and reducing or eliminating uneven wear between front and rear rings.

The term "seal" as used herein, refers to the creation, maintenance, or both of a high-pressure region and a low-pressure region. For example, a seal may include a sealing ring assembly that is configured to reduce a leakage rate of gas from a high-pressure region to a low-pressure region, by limiting flow between a high-pressure boundary and a low-pressure boundary of the seal. Accordingly, a seal can be defined in terms of its constraints on a leakage rate. It will be understood that a seal, such as a sealing ring assembly, as described herein, may have any suitable corresponding leakage rate. For example, in some circumstances, a relatively worse seal may allow more leakage, but may be acceptable based on one or more relevant performance criterion. In a further example, a sealing ring assembly configured for high efficiency operation of a piston and cylinder device may have a relatively low leakage rate (e.g., be a more effective seal).

As used herein, a "ring segment" shall refer to a sealing element extending for an azimuthal angle greater than zero degrees, having a radially outer surface, and configured to seal at least along a portion of the radially outer surface against a bore. A ring segment may include end faces, if not azimuthally contiguous around the full bore.

As used herein, a "ring" shall refer to a sealing element including at least one ring segment, which may be, but need not be, azimuthally contiguous along a bore. For example, a ring may include one ring segment, in which case these terms overlap. In a further example, a ring may include four ring segments, in which case the ring refers to the collective of the four ring segments. A ring may include, but need not include, one or more interfaces between one or more ring segments. A "ring" shall also refer to a sealing element including at least one ring segment configured to seal against a land of a piston.

As used herein, a "gap cover element" shall refer to a sealing element configured to seal against one or more ring segments at an interface, and to seal against at least a portion of a bore during wear of the one or more ring segments. While a gap cover element may function as a ring segment as the ring wears, for purposes of the discussion in the present disclosure, a gap cover element is not considered to be a ring segment for purposes of clarity.

As used herein, a "sealing ring assembly" shall refer to an assembly of one or more rings, and sometimes also one or more gap covers elements, configured to engage with a piston and configured to seal between a high-pressure region and a low-pressure region of a cylinder. For example, a single ring segment may be a ring and a sealing ring assembly. In a further example, several ring segments and corresponding gap covers may be a sealing ring assembly.

Some approaches to sealing gases in a cylinder with a moving piston include arranging two rings in a groove: a front or cover ring with an L-shaped cross section, and a rear ring of rectangular cross section that fits within the open portion of the L of the front ring. A ring may be split in one or more places, allowing pressure to expand the ring outward and maintain sealing contact with the bore as material is removed via wear during operation. The gaps in the two rings may be anti-aligned, such that as the ring assembly wears down radially, an effective seal is maintained. This arrangement of a front and a rear ring is often referred to in the field as a 'twin ring' and is usually an improvement over a single split ring. However, the twin ring arrangement still may have several constraining problems.

In the absence of lubricating oil, a sealing ring may include (e.g., be made from) a self-lubricating material such as, for example, a polymer, ceramic, or graphite. The use of a self-lubricating material in the seal reduces or eliminates scuffing or galling failures. However, the use of a self-lubricating material may sometimes result in a relatively high wear rate as compared to a conventional oil-lubricated seal arrangement in which the seal is constructed of a hard, wear-resistant material that travels on a thin film of oil. In some circumstances, higher wear is inherent to the self-lubricating material, as it transfers material to a counter-face (e.g., a bore of a cylinder) to form the lubricant film.

In some embodiments, a sealing ring assembly includes a radially outward face, an axially front face, and a circumferential groove cut along the radially outward face that extends at least a portion of a circumference of the radially outward face. In some embodiments, the groove is configured to receive a pressurized gas. In some embodiments, the sealing ring assembly includes an orifice, slot, or other suitable through feature on the axially front face that routes the pressurized gas to the groove. In some circumstances, when the pressurized gas is in the groove, an increase in pressure between the radially outward face and an inner surface of a cylinder at least above and in front of the groove is affected. For example, the groove helps in balancing radial pressure forces. In a further example, the groove is arranged at least halfway towards an axial rear of the radially outward face.

In some embodiments, a sealing ring assembly includes a ring face adjacent to a surface of a piston, and at least one feature on the ring face that engages with a corresponding at least one feature on the surface of the piston to prevent the sealing ring assembly from moving azimuthally. For example, the at least one feature constrains rotation of the sealing ring assembly in a ring groove of the piston. In a further example, the ring face is an axially rear face, a radially inward face, or both. In an illustrative example, the feature on the ring is a tab and the corresponding feature on the surface of the piston is a slot. In some embodiments, a sealing ring assembly may include at least two ring segments arranged with splits in between the segments, and each of the segments may include a feature of the at least one feature on the ring.

FIG. 1 shows a cross-sectional perspective view of a portion of an illustrative piston and cylinder assembly 100. Seal ring 102 is configured to seal between piston assembly 106 and cylinder 104, as piston assembly 106 moves axially in cylinder 104. After some amount of wear, as shown by piston and cylinder 110 of FIG. 1, sealing ring 112 exhibits a significant gap 118, which may serve as a leak path.

FIG. 2 shows a perspective view of a portion of illustrative piston assembly 130. Shown in FIG. 2 is leak path 140 of relatively high-pressure gas 142 past worn seal ring 134, arranged on piston 132, to a region of relatively lower pressure 144.

FIG. 3 shows a side view of a seal ring assembly 160, and gap 152 that has opened as ring assembly 160 wears. Ring segment 162 spans gap 152 in ring segment 164, and experiences high gas pressure (e.g., during the high-pressure portion of an engine cycle or air compression cycle) at one boundary, and low gas pressure (e.g., open to atmosphere or near atmospheric conditions). The resulting stress from the pressure forces may increase as gap 152 increases, making ring segment more susceptible to breakage. Ring breakage may result in further gaps being formed, or destruction of geometrical constraints, or both.

In some circumstances, it is desirable to minimize the size of any single gap. Some applicable techniques include dividing the total circumferential gap (e.g., which may be estimated as 2*pi*the amount of radial wear) into multiple smaller gaps rather than a single larger gap. If the ring segments can rotate relative to one another, however, multiple gaps might not address this problem because the segments can rotate until all the gaps are closed (ring ends butting) except for one, which is effectively equivalent to (e.g., or perhaps worse than) a single, large gap. To keep the gaps evenly distributed, an anti-rotation feature may be included (e.g., as part of the rear ring segments). The anti-rotation feature may include, for example, a tab that protrudes from one of the ring surfaces (e.g., from the front face) into a corresponding slot in the piston. For example, the tab may be machined into the rear segment with radiused fillets to reduce stress in the ring segment material. The tab may be, but need not be, located at or near the center of the ring segment, circumferentially, so that as the ring wears, the gaps on either end open symmetrically.

FIG. 4 shows a perspective view of a portion of illustrative piston assembly 200, in accordance with some embodiments of the present disclosure. Shown in FIG. 4 are cylindrical coordinate axes 250 (i.e., axial), 260 (i.e., radial), and 270 (i.e., azimuthal) for purposes of illustration. Piston assembly 200 includes piston 210 and sealing ring assembly 220. Sealing ring assembly 220 is arranged in a ring groove of piston 210, between front land 202 and rear land 206, which constrain the axial position of sealing ring assembly 220 and provide sealing surfaces for sealing ring assembly 220. Sealing ring assembly 220 extends azimuthally around piston 210 in the ring groove (e.g., to provide a seal between piston 210 and a cylinder bore). Sealing ring assembly 220 includes first ring 222 and second ring 224, which may act in concert to seal a high-pressure region from a low-pressure region (e.g., on either axial side of piston assembly 200 when installed in a piston and cylinder assembly).

Piston 210, as illustrated in FIG. 4, is an open-faced piston, although it will be understood that any suitable piston type, having any suitable piston face, may be used in accordance with the present disclosure. Piston 210 includes piston face 212, which may be configured to bound a high-pressure region (e.g., a combustion section, or an air compression section). Piston face 212 is the region of piston 210 radially inwards from structural webs 214 and openings 218 (e.g., illustrated as a mostly flat circular area in FIG. 4). Piston 210 includes openings 218 (e.g., spaced apart), separated by structural webs 214, which connect piston face 210 to front land 202. Accordingly, fluid (e.g., high pressure gas) from the high-pressure region may flow into openings 218, correspondingly pressurizing a high-pressure boundary of sealing ring assembly 220 (e.g., at a radially inner surface of sealing ring assembly 220). Piston 210 may be configured to travel along axis 250 within a bore of a cylinder (not shown in FIG. 4).

Figure 5:
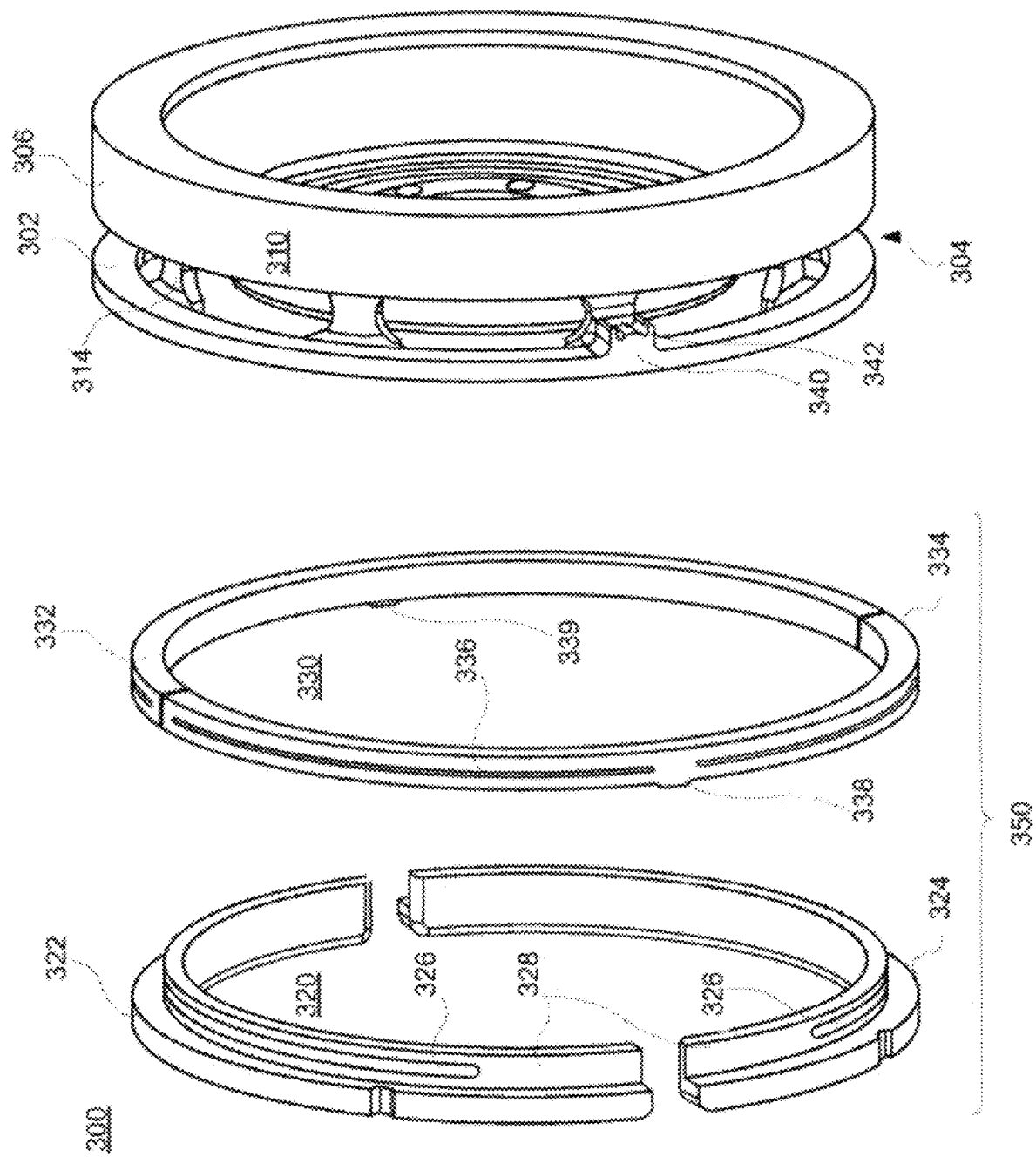
FIG. 5 shows an exploded perspective view of a portion of an illustrative piston assembly, in accordance with some embodiments of the present disclosure.

FIG. 5 shows an exploded perspective view of a portion of illustrative piston assembly 300, in accordance with some embodiments of the present disclosure. Piston assembly 300 includes piston 310, and sealing ring assembly 350, which includes first ring 320 and second ring 330. Piston 310 may be similar to piston 210 of FIG. 4, for example. Sealing ring assembly 350 may be similar to sealing ring assembly 210 of FIG. 4, for example.

Piston 310 includes front land 302, rear land 306, ribs 314, anti-rotation feature 340, and ring groove 304. Sealing ring assembly 350 may be arranged in ring groove 304. Anti-rotation 340 may constrain motion of sealing ring assembly 350 in an azimuthal direction (e.g., around piston 310 in ring groove 304).

First ring 320 includes first ring segment 322 and second ring segment 324. Additionally, first ring 320 may be referred to as a ring having two splits or being split into two ring segments. The first ring being "split" may refer to a fabrication process (e.g., the first ring is fabricated as a single part and separated into two ring segments), or the general geometry of ring segments 322 and 324 arranged end to end and extending azimuthally around, wholly or partially, a ring groove of a piston. The split itself refers to the interface between first ring segments, which may include a gap, contact between the first ring segments, or a combination thereof. Although shown in FIG. 5 as having two segments and two splits, a ring (e.g., a first ring or second ring) may include any suitable number of segments and splits (e.g., one or more).

Second ring 330 includes second ring segment 332 and second ring segment 334. Additionally, second ring 330 may be referred to as a ring having two splits or being split into two ring segments. Second ring segments 332 and 334 may each include pocket 336. For example, pocket 336 may be configures to aid in balancing radial forces on sealing ring assembly 350 during operation.

In some embodiments, as illustrated in FIG. 5, anti-rotation feature 340 may be arranged in a split between first ring segments 322 and 324 to constrain azimuthal motion of first ring segments 322 and 324. Anti-rotation feature 340 includes anti-rotation relief 342, configured to engage with anti-rotation tab 338 of second ring segment 334, thereby constraining azimuthal motion of second ring 330. Note, although not shown in FIG. 5, there is a second anti-rotation feature diametrically opposed to anti-rotation feature 340 (e.g., on the other side of piston 310), which may include an anti-rotation relief for engaging with anti-rotation tab 339 of second ring segment 332. Any suitable number of anti-rotation features may be included and may be configured to engage with any suitable number of corresponding features of a first or second ring, or segments thereof.

First ring segments 322 and 324 may each include groove 326, which extends circumferentially along an outer radial surface of extension 328, which may also be split (e.g., as shown in FIG. 5). Groove 326 may, for example, be open to a low-pressure boundary of sealing ring assembly 350 during operation. Accordingly, groove 326 may allow pressure-locking of sealing ring assembly 350 during suitable operation. For example, groove 326 may be configured to use a difference in pressure to lock (e.g., via pressure-locking) differing ring segments to one another (e.g., ring segments 322 and 324 to ring segments 332 and 334).

Figure 6:
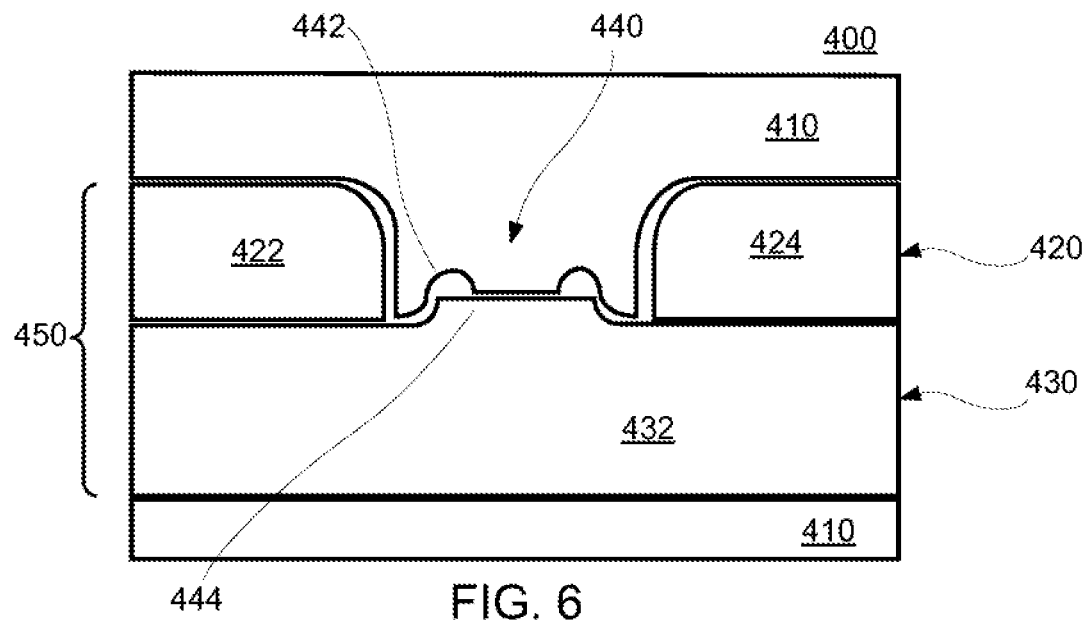
FIG. 6 shows a side view of a portion of an illustrative piston assembly, having an anti-rotation feature, in accordance with some embodiments of the present disclosure.

FIG. 6 shows a side view of a portion of illustrative piston assembly 400, having anti-rotation feature 440, in accordance with some embodiments of the present disclosure. Piston assembly 400 includes piston 410 and sealing ring assembly 450 arranged in a ring groove of piston 410. Sealing ring assembly 450 includes first ring 420 and second ring 430. Anti-rotation feature 440 may include anti-rotation relief 442 of piston 410 and anti-rotation tab 444 of sealing ring assembly 420 which may engage with anti-rotation relief 442. Engagement of anti-rotation tab 444 with anti-rotation relief 442 may prevent, or reduce, azimuthal movement of the second ring. For example, first ring segments 422 and 424 of first ring 420 may be constrained to move in an azimuthal direction by the solid portion of piston 410 that includes anti-rotation relief 442. Anti-rotation relief 442 may include any suitable shape of relief, which may engage with anti-rotation tab 444. As shown illustratively in FIG. 6, anti-rotation tab 444 is part of second ring segment 432. For example, anti-rotation relief may include a pocket, a slot, a notch, a cutout, or recess configured to mate with a tab.

Figure 7:
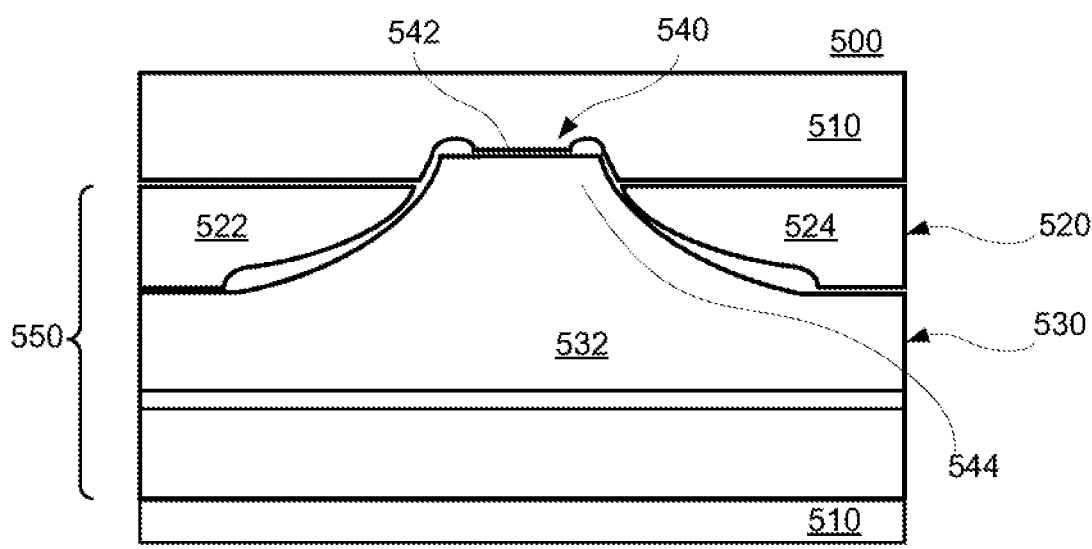
FIG. 7 shows a side view of a portion of an illustrative piston assembly, having an anti-rotation feature, in accordance with some embodiments of the present disclosure.

FIG. 7 shows a side view of a portion of illustrative piston assembly 500, having anti-rotation feature 540, in accordance with some embodiments of the present disclosure. Piston assembly 500 includes piston 510 and sealing ring assembly 550. Sealing ring assembly 550 includes first ring 520 and second ring 530. Anti-rotation feature 540 may include anti-rotation relief 542 of piston 510 and anti-rotation tab 544 of sealing ring assembly 520 which may engage with anti-rotation relief 542. Engagement of anti-rotation tab 544 with anti-rotation relief 542 may prevent, or reduce, azimuthal movement of the first ring, the second ring, or both. For example, first ring segments 522 and 524 of first ring 520 may be constrained to move in an azimuthal direction by anti-rotation tab 544 of second ring segment 532. Anti-rotation relief 542 may include any suitable shape of relief, which may engage with anti-rotation tab 544. As shown illustratively in FIG. 7, anti-rotation tab 544 is part of second ring segment 532.

Figure 8:
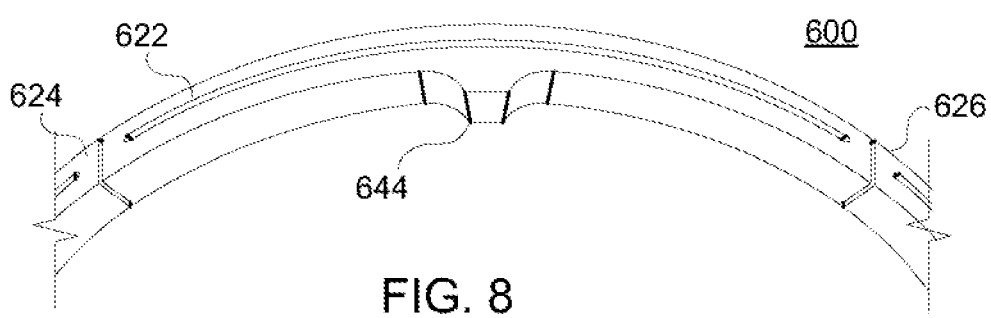
FIG. 8 shows a side view of a portion of an illustrative second ring, having an anti-rotation tab, in accordance with some embodiments of the present disclosure.

FIG. 8 shows a side view of a portion of illustrative second ring 600, having anti-rotation tab 644, in accordance with some embodiments of the present disclosure. Second ring 600 includes, at least, second ring segments 622, 624, and 626. Second ring segment 622 may be similar to second ring segment 532 of FIG. 7, for example. Accordingly, anti-rotation tab 644 may be configured to engage with a corresponding anti-rotation relief of a suitable piston.

Figure 9:
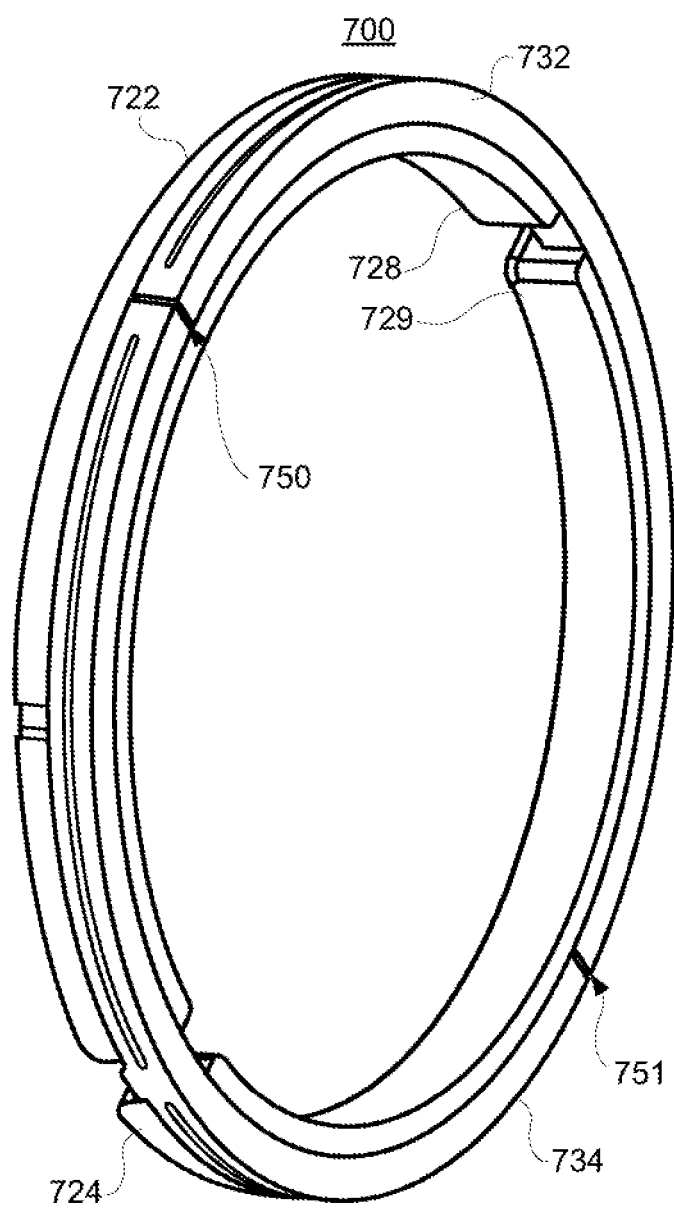
FIG. 9 shows a perspective view of an illustrative sealing ring assembly, in accordance with some embodiments of the present disclosure.

FIG. 9 shows a perspective view of illustrative sealing ring assembly 700, in accordance with some embodiments of the present disclosure. Sealing ring assembly 700 includes first ring segments 722 and 724, and second ring segments 732 and 734. Second ring segments 732 and 734 are arranged radially outward of extensions 728 and 729 of respective first ring segments 722 and 724. Sealing ring assembly 700 may be similar to an assembled configuration of sealing ring assembly 350 of FIG. 5, for example. Gaps 750 and 751 are between second ring segments 732 and 734. For example, as sealing ring assembly 700 wears, gaps 750 and 751 may widen.

Figure 10:
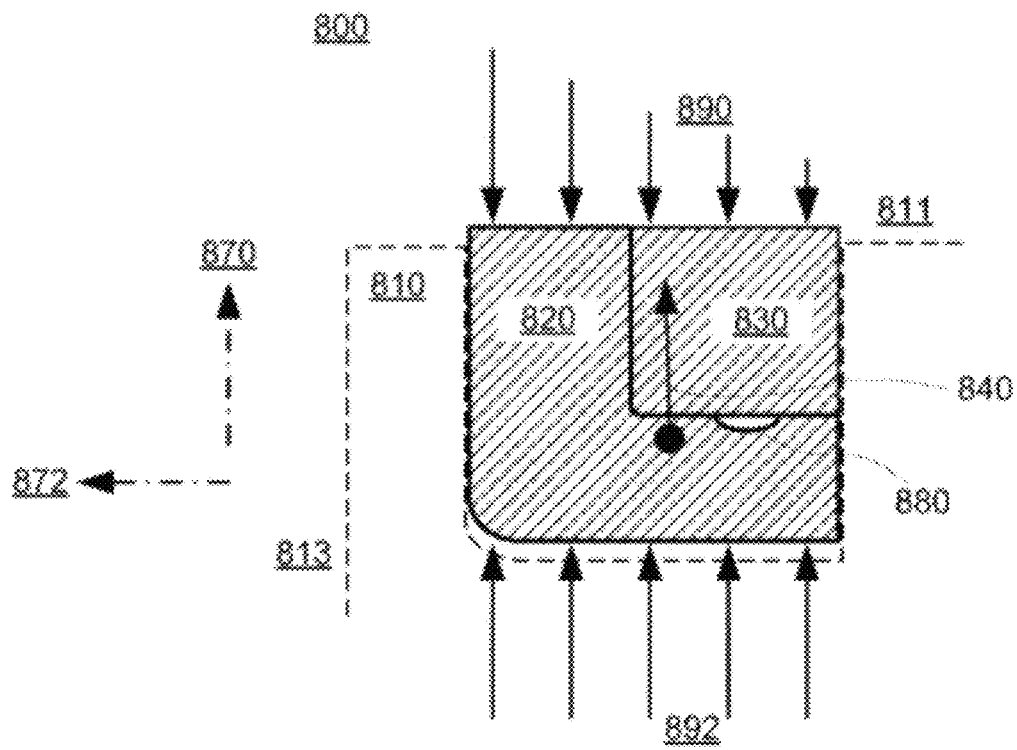
FIG. 10 shows a cross section view of an illustrative sealing ring assembly including a feature for pressure locking, in accordance with some embodiments of the present disclosure.

FIG. 10 shows a cross section view of illustrative sealing ring assembly 800 including a feature for pressure locking (i.e., groove 880), in accordance with some embodiments of the present disclosure. Coordinate axes 870 (i.e., radial), and 872 (i.e., axial) are provided in FIG. 10 for purposes of clarity. Sealing ring assembly 800 is configured to be arranged in a ring groove of piston 810.

The feature for pressure locking (i.e., groove 880, as shown illustratively in FIG. 10) may aid in maintaining sealing ring assembly 800 in an intended configuration during operation, which is referred to herein as pressure locking. During operation (e.g., in a device including a piston and cylinder assembly), groove 880 may be configured to include gas at a pressure close to a pressure of a low-pressure boundary of sealing ring assembly 800. For example, during operation, groove 880 may achieve, or nearly achieve, a pressure of a low-pressure region (e.g., low-pressure region 811) at the rear of sealing ring assembly 800.

To illustrate, in the absence of groove 880, as the "twin ring" (e.g., sealing ring assembly 800) wears, rear ring 830 (e.g., a second ring) may tend to wear at a faster rate than front ring 820 (e.g., a first ring). This is due to the pressure dropping axially along the axial length of sealing ring assembly 800 (e.g., dropping from left to right as illustrated by the top arrows 890 pointing downwards). Accordingly, the pressure on the outside of the rear ring is lower than the peak pressure. If pressure gets between the front ring 820 and rear ring 830 (e.g., and thus exposes the rear segments to a pressure of the high-pressure region) rear ring 830 will then tend to be more strongly biased radially outwards than front ring 820. As rear ring 830 wears at a greater rate, a gap between the rear ring segments will open. Gas from the high-pressure region then more easily gets between the segments, increasing the outward force, and a runaway condition may occur. Further, the flow of gas from high pressure region 813 into the gap may be characterized as leaking past the seal.

Figure 11:
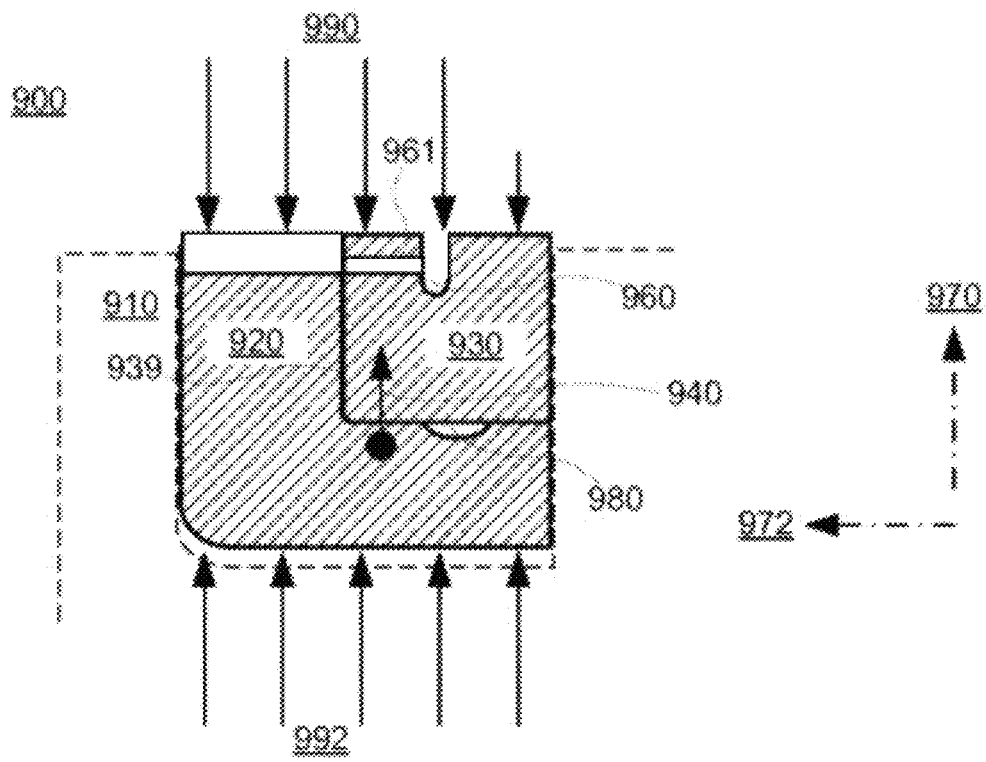
FIG. 11 shows a cross section view of an illustrative sealing ring assembly including a feature for pressure locking and a feature for balancing radial forces, in accordance with some embodiments of the present disclosure.

In some embodiments, a groove (e.g., groove 880) is formed (e.g., cut) in one of the rings at the radial interface between front ring 820 and rear ring 830. As illustrated in FIGS. 10-11, the groove 880 is formed in front ring 820, although it may be formed in either or both rings at their interface. The groove 880 may be included in the interface at the outer surface of front ring 820, the inner surface of rear ring 830, or both. In some embodiments, the groove 880 is centered on, and open to, a split in rear ring 830. The ends of groove 880 are closed before reaching the split in front ring 820. When the sealing ring assembly is in operation (e.g., in a piston-cylinder device), the split in rear ring 830 is at low pressure because it is open to the rear of sealing ring assembly 800 and is closed off from the front of sealing ring assembly 800. For example, this is illustrated by gaps 750 and 751 between second ring segments 732 and 734 of FIG. 9, which couple the grooves to a low-pressure region. Therefore, groove 880 between the two rings is also at low pressure, ensuring a low pressure between the front and rear segments which helps in them staying radially locked together.

Illustrative radial pressure fields 890 (i.e., acting radially inward) and 892 (i.e., acting radially outward) may act on sealing ring assembly 800 during operation. Radial pressure field 892 is directed radially outward and is created by gas from a high-pressure region acting on the radially inner surface of sealing ring assembly 800. Radial pressure field 890 is directed radially inward and is created by gas in the clearance between sealing ring assembly 800 and a corresponding bore of a cylinder. The resultant force 840 is directed radially outward, pushing sealing ring assembly 800 radially outward. The magnitude of resultant force 840 may impact a wear rate of sealing ring assembly 800. For example, a larger resultant force may cause a larger normal force of a sealing ring assembly against a bore, which during motion of the sealing ring assembly may lead to increased friction force. Accordingly, increased friction work may result in increased wear on the sealing ring assembly.

FIG. 11 shows a cross section view of illustrative sealing ring assembly 900 including a feature for pressure locking (i.e., groove 980, as shown illustratively in FIG. 11) and a feature for balancing radial forces (i.e., pocket 960, as shown illustratively in FIG. 9), in accordance with some embodiments of the present disclosure. Coordinate axes 970 (i.e., radial), and 972 (i.e., axial) are provided in FIG. 11 for purposes of clarity. Sealing ring assembly 900 includes front ring 920 and rear ring 930. Sealing ring assembly 900 is configured to be arranged in a ring groove of piston 910.

The feature for pressure locking (i.e., groove 980, as shown illustratively in FIG. 11) may aid in maintaining sealing ring assembly 900 in an intended configuration during operation, which is referred to herein as pressure locking. During operation (e.g., in a device including a piston and cylinder assembly), groove 980 may be configured to include gas at a pressure close to a pressure of a low-pressure boundary of sealing ring assembly 900. For example, during operation, groove 980 may achieve, or nearly achieve, a pressure of a low-pressure region at the rear of sealing ring assembly 900 (e.g., to the right in FIG. 11).

Illustrative radial pressure fields 990 (i.e., acting radially inward) and 992 (i.e., acting radially outward) may act on sealing ring assembly 900 during operation. Radial pressure field 992 is directed radially outward and is created by gas from a high-pressure region acting on the radially inner surface of sealing ring assembly 900. Radial pressure field 990 is directed radially inward and is created by gas in the clearance between sealing ring assembly 900 and a corresponding bore of a cylinder. Radial pressure field 990 is relatively larger than radial pressure field 890 (e.g., as shown in FIG. 10), under similar conditions, due to pocket 960 which allows high pressure gas to flow and affect radial pressure field 990. The resultant force 940 is directed radially outward, pushing sealing ring assembly 900 radially outward. The magnitude of resultant force 940 is larger than resultant force 840 (e.g., as shown in FIG. 10). This is because, for example, radial pressure fields 892 and 992 are substantially similar, but the inward force from radial pressure field 890 is less than the inward force from radial pressure field 990 (e.g., when radial pressure fields are integrated over the surface).

In some embodiments, the farther towards the rear (axially) of sealing ring assembly 900 that pocket 960 is located, the more resultant force 940, and hence wear, may be reduced. There are practical limitations, however, to how close to the rear (axially) of sealing ring assembly 900 that pocket 960 may be located. This may be due to the strength of the ring, increased leakage, or both. In some embodiments, pocket 960 may be located in the rear half of sealing ring assembly 900, axially. For example, in some embodiments, the center of pocket 960 may be located between 50% and 80% of the axial length of sealing ring assembly 900 from the front face (e.g., face 939). It will be understood that the pocket location may be located at any suitable axial position (e.g., centered about any suitable axial position).

In some embodiments, to help reduce wear, pocket 960 may cover as much of the circumferential extent of sealing ring assembly 900 as possible. However, in some embodiments, pocket 960 does not intersect the splits in the sealing ring assembly (e.g., which may cause increased gas leakage and a poorer seal). For example, in some embodiments, pocket 960 may extend most, but not all, of the way around sealing ring assembly 900 (e.g., as illustrated in FIG. 5).

In some embodiments, pocket 960 can be pressurized at, or near to, the pressure of a high-pressure region. In some embodiments, a hole or other passage (e.g., passage 961) may be formed (e.g., drilled) axially through sealing ring assembly 900, thus connecting pocket 960 to an axially front face of the sealing ring assembly 900.

FIG. 12 shows a perspective view of a portion of illustrative sealing ring assembly 1200 including a feature for balancing radial forces 1260, in accordance with some embodiments of the present disclosure. Sealing ring assembly 1200 includes first ring 1220 and second ring 1230. Second ring 1230 includes pocket 1260, which extends circumferentially in an outer radial surface of the second ring. In some embodiments, pocket 1260 is configured to receive high pressure gas (e.g., from a high-pressure region of a piston cylinder device). In some embodiments, second ring 1230 may include orifice 1262, which may allow gas to flow from a high-pressure boundary of sealing ring assembly 1200 to pocket 1260. For example, orifice 1262 may be open to pocket 1060, allowing the gas to flow. First ring 1220 may include recess 1264, or other feature, to allow orifice 1262 to receive high pressure gas during operation. Orifice 1262 may include a hole, passage, or other opening which may allow suitable gas flow.

FIG. 13 shows a perspective view of portion 1250 of illustrative sealing ring assembly 1200 of FIG. 12, in accordance with some embodiments of the present disclosure. Portion 1250 is shown by section 1270 of FIG. 12, viewed in direction 1272. Recess 1264 in first ring 1220 allows a relatively open flow path for high-pressure gas to enter orifice 1262. Accordingly, in some circumstances, sealing ring assembly 1200 may be configured to seal between a high-pressure region and a low-pressure region, and exhibit relatively lower wear (e.g., as compared to sealing ring assembly 800 of FIG. 10) because of pocket 1260 for radial pressure balancing (e.g., similar to sealing ring assembly 900 of FIG. 11). Under some circumstances, first ring 1220 and second ring 1230 may move azimuthally relative to one another as sealing ring assembly 1200 wears. Accordingly, recess 1264 may include a slot (e.g., as shown in FIG. 13) rather than a circular hole, such that the pressurization pathway remains open as the ring wears.

Figure 14:
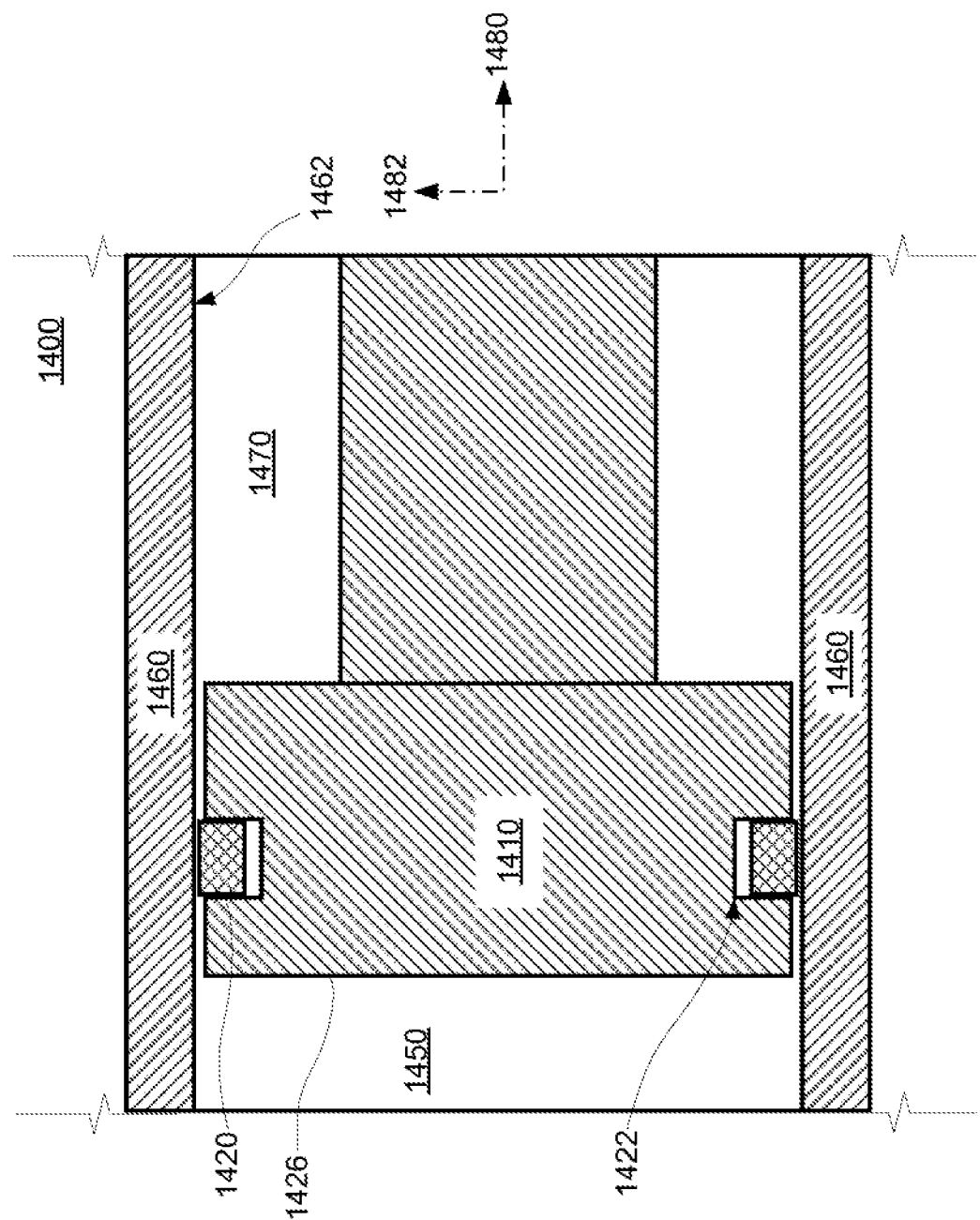
FIG. 14 shows a cross section view of an illustrative piston and cylinder assembly, in accordance with some embodiments of the present disclosure.

FIG. 14 shows a cross section view of illustrative piston and cylinder assembly 1400 including sealing ring assembly 1420, in accordance with some embodiments of the present disclosure. Cylinder 1460 may include bore 1462, which is the inner cylindrical surface in which piston assembly 1410 travels. Piston assembly 1410 may include piston 1426, which includes a sealing ring groove 1422, in which sealing ring assembly 1420 is configured to ride. As piston assembly 1410 translates along the axial direction shown by axis 1480 (e.g., during an engine cycle), in cylinder 1460, the gas pressure in high-pressure region 1450 may change (high-pressure region 1450 may be closed with a cylinder head or an opposing piston). For example, as piston assembly 1410 moves opposite the direction of axis 1480 (i.e., to the left in FIG. 14), the pressure in high-pressure region 1450 may increase. Low-pressure region 1470, located to the rear of sealing ring assembly 1420 may be at a gas pressure below the pressure of high-pressure region 1450 for at least some, if not most, of a piston stroke or cycle of the piston and cylinder assembly. The pressure ranges in high-pressure region 1450 and low-pressure region 1470 may be any suitable ranges (e.g., sub-atmospheric pressure to well over 250 bar), and may depend on compression ratio, breathing details (e.g., boost pressure, pressure waves, port timing), losses, thermochemical properties of gases, and reaction thereof. Accordingly, the sealing ring assemblies described herein may be used to seal any suitable high-pressure region and low-pressure region, having any suitable pressure ranges. For example, in some embodiments, low pressure region 1470 may interact flow-wise with intake or exhaust ducting that is in communication with breathing ports (not shown), and be maintained relatively near to a pressure in the ducting. In accordance with the present disclosure, sealing ring assemblies may be used to seal high-pressure regions from low-pressure regions for at least part of a piston stroke or cycle of a piston and cylinder assembly. It will be understood that the "front" of sealing ring assembly 1420 refers to the face axially nearest high-pressure region 1450, and the "rear" of sealing ring assembly 1420 refers to the face axially nearest low-pressure region 1470.

It will be understood that unless otherwise specified, all pressures referred to herein are in absolute units (e.g., not gage or relative).

It will be understood that high-pressure and low-pressure may refer to transient pressure states of a piston and cylinder device. For example, referencing an engine cycle, the high-pressure side of a sealing ring assembly may have a pressure greater than a low-pressure side of the sealing ring assembly for most of the engine cycle (e.g., except possibly during breathing or near-breathing portions of the cycle). Accordingly, high-pressure and low pressure are relative and depend on the conditions of the gas being sealed.

A sealing ring assembly may be used to seal a high pressure and a low-pressure region, each operating in any suitable pressure range. It will also be understood that a sealing ring assembly may seal differently at different positions in a cycle. It will be further understood that a low-pressure region may include a pressure greater than a pressure of a high-pressure region for some of a piston stroke or cycle of a piston and cylinder assembly. For example, a sealing ring assembly may always seal a high-pressure region from a low-pressure region. In a further example, a sealing ring assembly may seal a high-pressure region from a low-pressure region as long as the pressure in the high-pressure region is greater than the pressure in the low-pressure region. In a further example, a sealing ring assembly may seal a high-pressure region from a low-pressure region as long as the pressure in the high-pressure region is greater than the pressure in the low-pressure region, and conversely, seal a low-pressure region from a high-pressure region as long as the pressure in the low-pressure region is greater than the pressure in the high-pressure region.

In some embodiments, sealing ring assembly 1420 may deposit material on bore 1462 of cylinder 1460 (e.g., include a self-lubricating material). Deposited material may lubricate the bore-to-sealing ring assembly interface between bore 1462 and sealing ring assembly 1420 (e.g., provide a dry lubricant). Accordingly, in some embodiments, piston and cylinder assembly 1400 may operate without oil for lubrication.

In some embodiments, piston 1426 may be an open-faced piston. For example, piston 1426 may include openings, cutouts, or other fluid paths from high pressure region 1450 to ring groove 1422. Accordingly, in some embodiments employing an open-faced piston, the inner radial surfaces (e.g., referencing axis 1482 in the radial direction in FIG. 14) of sealing ring assembly 1420 may be exposed to gas pressure of high pressure region 1450.

Figure 15:
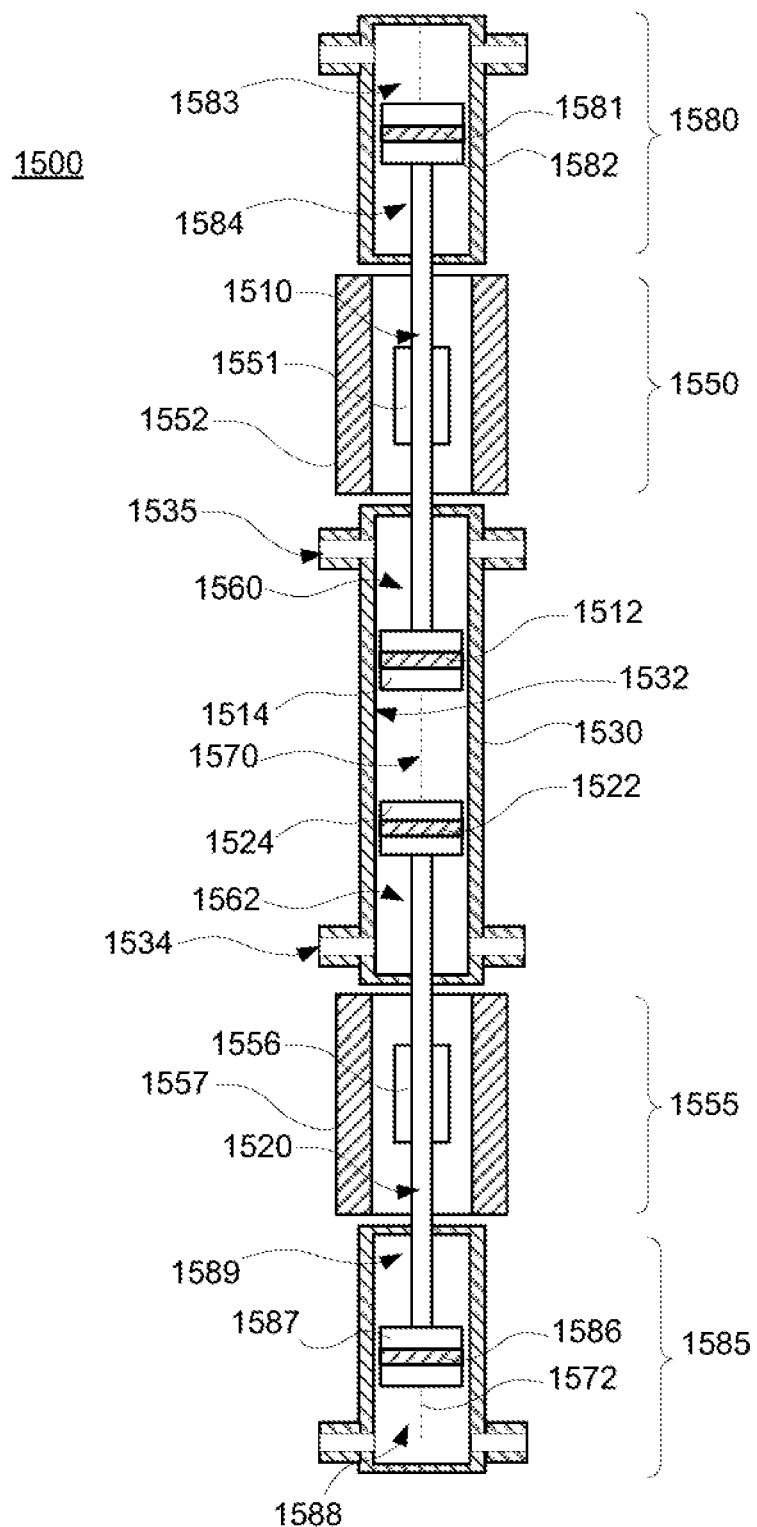
FIG. 15 shows a cross section view of an illustrative device, including a piston and cylinder assembly, in accordance with some embodiments of the present disclosure.

FIG. 15 shows a cross-sectional view of illustrative device 1500 including two free piston assemblies 1510 and 1520 that include respective sealing ring assemblies 1512 and 1522 in accordance with some embodiments of the present disclosure. In some embodiments, device 1500 may include linear electromagnetic machines 1550 and 1555 to convert between kinetic energy of respective free piston assemblies 1510 and 1520 and electrical energy. In some embodiments, device 1500 may include gas regions 1560 and 1562, which may, for example, be at a relatively lower pressure than gas region 1570 (e.g., a high-pressure region) for at least some, if not most, of a cycle (e.g., an engine cycle, or an air compression cycle). For example, gas regions 1560 and 1562 (e.g., low pressure regions) may be open to respective breathing ducting (e.g., an intake manifold, an intake system, an exhaust manifold, an exhaust system). To illustrate, breathing ports 1534 and 1535 are configured to provide reactants to, and remove exhaust from, bore 1532 of cylinder 1530. In a further example, gas regions 1560 and 1562 may be vented to atmosphere (e.g., be at about 1.01 bar absolute pressure). In some embodiments, device 1500 may include gas springs 1580 and 1585, which may be used to store and release energy during a cycle in the form of compressed gas (e.g., a driver section). For example, free piston assemblies 1510 and 1520 may each include respective pistons 1582 and 1587, having grooves for respective sealing ring assemblies 1581 and 1586, to seal respective gas regions 1583 and 1588 (e.g., high-pressure regions) from respective gas regions 1584 and 1589 (e.g., low-pressure regions).

Cylinder 1530 may include bore 1532, centered about axis 1572. In some embodiments, free piston assemblies 1510 and 1520 may translate along axis 1572, within bore 1532, allowing gas region 1570 to compress and expand. For example, gas region 1570 may be at relatively high pressure as compared to gas region 1560 for at least some of a stroke of free piston assemblies 1510 and 1520 (e.g., which may translate along axis 1572 in opposed piston synchronization). Sealing ring assemblies 1512 and 1522 may seal gas region 1570 from respective gas regions 1560 and 1562 within bore 1532. In some embodiments, free piston assemblies 1510 and 1520 may include respective pistons 1514 and 1524, and respective sealing ring assemblies 1512 and 1522 which may be arranged in respective corresponding grooves of pistons 1514 and 1524. It will be understood that gas regions 1560 and 1562, and gas region 1570, may change volume as free piston assemblies 1510 and 1520 move or are otherwise positioned at different locations along axis 1572. The portions of respective sealing ring assemblies 1512 and 1522 nearest gas region 1570 are each termed the front, and the portion of sealing ring assemblies 1512 and 1522 nearest respective gas regions 1560 and 1562 are each termed the rear. Sealing ring assemblies 1512 and 1522 may each include a high-pressure boundary, which may each depend on a pressure in gas region 1570. For example, a high-pressure boundary of sealing ring assembly 1512 may be open to gas region 1570 (e.g., coupled by one or more orifices, or other opening), and have a corresponding pressure the same as (e.g., if gas from gas region 1570 is unthrottled in the sealing ring assembly), or less than (e.g., if gas from gas region 1570 is throttled in the sealing ring assembly), the pressure of gas region 1570. Sealing ring assemblies 1512 and 1522 may each include a low-pressure boundary, which may depend on a gas pressure in respective gas regions 1560 and 1562. For example, a low-pressure boundary of sealing ring assembly 1512 may be open to gas region 1560 and have a corresponding pressure about the same as the pressure of gas region 1560. In some embodiments, as sealing ring assemblies 1512 and 1522 axially pass over respective ports 1535 and 1534 (e.g., and corresponding port bridges, although not shown), they may experience uneven, or reduced, inward force from bore 1532.

In some embodiments, pistons 1514 and 1524 may each include one or more grooves into which one or more respective sealing ring assemblies may be arranged. For example, as shown in FIG. 15, pistons 1514 and 1524 may each include one groove, into which sealing ring assembly 1512 and sealing ring assembly 1522 may be installed, respectively. In a further example, although not shown in FIG. 15, piston 1514 may include two grooves, in which two respective sealing ring assemblies may be installed. In a further example, piston 1514 may include two grooves, the first sealing ring assembly 1512, and the second (not shown), arranged to the rear of sealing ring assembly 1512, but with its front nearer to gas region 1560, thereby sealing pressure in gas region 1560 to pressure between the two sealing ring assemblies (e.g., which may be less than pressure in gas region 1570). Accordingly, a sealing ring assembly may be used to seal any suitable high pressure and low-pressure regions from each other.

In some embodiments, free piston assemblies 1510 and 1520 may include respective magnet sections 1551 and 1556, which interact with respective stators 1552 and 1557 to form respective linear electromagnetic machines 1550 and 1555. For example, as free piston assembly 1510 translates along axis 1572 (e.g., during a stroke of an engine cycle), magnet section 1551 may induce current in windings of stator 1552. Further, current may be supplied to respective phase windings of stator 1552 to generate an electromagnetic force on free piston assembly 1510 (e.g., to effect motion of free piston assembly 1510).

In some embodiments, pistons 1514 and 1524, sealing ring assemblies 1512 and 1522, and cylinder 1530 may be considered a piston and cylinder assembly. In some embodiments, device 1500 may be an engine, an air compressor, any other suitable device having a piston and cylinder assembly, or any combination thereof. In some embodiments, device 1500 need not include two free piston assemblies. For example, cylinder 1530 could be closed (e.g., with a cylinder head), and free piston assembly 1510 alone may translate along axis 1572.

It will be understood that the present disclosure is not limited to the embodiments described herein and can be implemented in the context of any suitable system. In some suitable embodiments, the present disclosure is applicable to reciprocating engines and compressors. In some embodiments, the present disclosure is applicable to free-piston engines and compressors. In some embodiments, the present disclosure is applicable to combustion and reaction devices such as a reciprocating engine and a free-piston engine. In some embodiments, the present disclosure is applicable to non-combustion and non-reaction devices such as reciprocating compressors and free-piston compressors. In some embodiments, the present disclosure is applicable to gas springs. In some embodiments, the present disclosure is applicable to oil-free reciprocating and free-piston engines and compressors. In some embodiments, the present disclosure is applicable to oil-free free-piston engines with internal or external combustion or reactions. In some embodiments, the present disclosure is applicable to oil-free free-piston engines that operate with compression ignition, spark ignition, or both. In some embodiments, the present disclosure is applicable to oil-free free-piston engines that operate with gaseous fuels, liquid fuels, or both. In some embodiments, the present disclosure is applicable to linear free-piston engines. In some embodiments, the present disclosure is applicable to engines that can be combustion engines with internal combustion/reaction or any type of heat engine with external heat addition (e.g., from a heat source or external reaction such as combustion).

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A sealing ring assembly for sealing between a piston and a bore of a cylinder, wherein during translation of the piston in the bore, the sealing ring assembly comprises:
   a first surface exposed to a first pressure;
   a second surface exposed to a second pressure less than the first pressure; and
   a through feature between the first surface and the second surface, wherein the through feature communicates pressure from a first region to a second region.

2. The sealing ring assembly of claim 1, wherein the second region is radially outward of the sealing ring assembly.

3. The sealing ring assembly of claim 1, wherein the second surface is a radially outward surface of the sealing ring assembly.

4. The sealing ring assembly of claim 1, wherein the first region comprises a high pressure region.

5. The sealing ring assembly of claim 4, wherein the high pressure region comprises a reaction section of the cylinder.

6. The sealing ring assembly of claim 1, further comprising an orifice on the first surface.

7. The sealing ring assembly of claim 6, wherein the through feature provides fluid communication between the orifice and a groove.

8. The sealing ring assembly of claim 7, wherein the second surface comprises the groove.

9. The sealing ring assembly of claim 1, further comprising a flow path between the first surface and the second surface.

10. The sealing ring assembly of claim 9, wherein the flow path comprises:
    an orifice on the first surface, wherein the first surface is exposed to the first region;
    a groove on the second surface; and
    a through feature providing fluid communication between the orifice and the groove.

11. The sealing ring assembly of claim 10, wherein the fluid communication is between the first region and the second region.

12. The sealing ring assembly of claim 10, wherein the groove balances radial forces along the second surface.

13. A sealing ring assembly for sealing between a piston and a bore of a cylinder, the sealing ring assembly comprises:
    a first surface configured to be exposed to a first pressure during translation of the piston;
    a second surface configured to be exposed to a second pressure less than the first pressure during the translation of the piston; and
    a through feature between the first surface and the second surface, wherein the through feature is configured to communicate pressure from a first region to a second region during the translation of the piston.

14. The sealing ring assembly of claim 13, wherein the second surface is configured to contact a cylinder bore.

15. The sealing ring assembly of claim 13, wherein the first region comprises a high pressure region.

16. The sealing ring assembly of claim 15, wherein the high pressure region comprises a reaction section of the cylinder.

17. The sealing ring assembly of claim 13, further comprising an orifice on the first surface.

18. The sealing ring assembly of claim 17, wherein the through feature provides fluid communication between the orifice and a groove.

19. The sealing ring assembly of claim 18, wherein the second surface comprises the groove.

20. The sealing ring assembly of claim 13, further comprising a flow path between the first surface and the second surface.

21. The sealing ring assembly of claim 20, wherein the flow path comprises:
   an orifice on the first surface, wherein the first surface is exposed to the first region;
   a groove on the second surface; and
   a through feature providing fluid communication between the orifice and the groove.

22. The sealing ring assembly of claim 21, wherein the fluid communication is between the first region and the second region.

23. The sealing ring assembly of claim 21, wherein the groove balances radial forces along the second surface.

24. A device comprising:
   a cylinder comprising:
      a bore,
      a first region configured to be at a first pressure as a piston translates in the bore, and
      a second region configured to be at a second pressure less than the first pressure as the piston translates in the bore; and
   a sealing ring assembly arranged in the piston, the sealing ring assembly comprising a flow path that comprises:
      an orifice on a first surface, wherein the first surface is exposed to the first region,
      a groove on a second surface, and
      a through feature providing fluid communication between the orifice and the groove.

25. The device of claim 24, wherein the second region is radially outward of the sealing ring assembly.

26. The device of claim 24, wherein the second region is exposed to the second surface of the sealing ring assembly.

27. The device of claim 24, wherein the first region comprises a high pressure region.

28. The device of claim 27, wherein the high pressure region comprises a reaction section of the cylinder.

29. The device of claim 24, further comprising an orifice on the first surface.

30. The device of claim 24, wherein the through feature provides fluid communication between the orifice and the groove.

31. The device of claim 24, wherein the groove balances radial forces along the second surface.

* * * * *